June 3, 1930.  F. H. SLEEPER  1,761,279
MACHINE FOR MAKING LOCK WASHERS
Filed March 4, 1926   3 Sheets-Sheet 1

Inventor:
Frank H. Sleeper
By Attorney
Owen W. Kennedy

June 3, 1930.    F. H. SLEEPER    1,761,279
MACHINE FOR MAKING LOCK WASHERS
Filed March 4, 1926    3 Sheets-Sheet 2
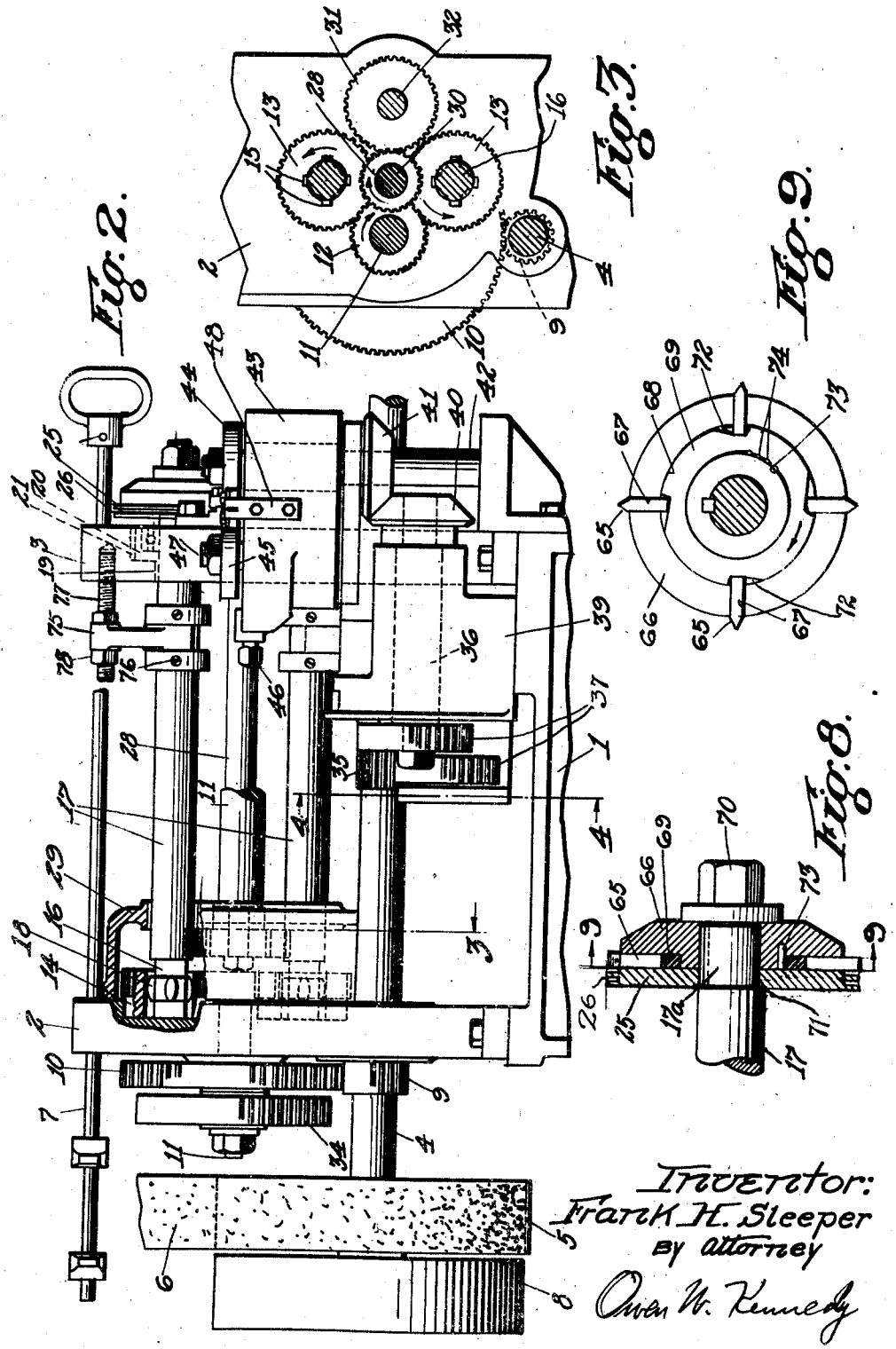
Inventor:
Frank H. Sleeper
By Attorney
Owen W. Kennedy June 3, 1930.   F. H. SLEEPER   1,761,279
MACHINE FOR MAKING LOCK WASHERS
Filed March 4, 1926   3 Sheets-Sheet 3

Inventor:
Frank H. Sleeper
By attorney
Owen W. Kennedy

Patented June 3, 1930

1,761,279

UNITED STATES PATENT OFFICE

FRANK H. SLEEPER, OF WORCESTER, MASSACHUSETTS, ASSIGNOR TO SLEEPER & HARTLEY, INC., OF WORCESTER, MASSACHUSETTS, A CORPORATION OF MASSACHUSETTS

MACHINE FOR MAKING LOCK WASHERS

Application filed March 4, 1926. Serial No. 92,258.

My invention relates to the production of lock washers by the severance, at intervals, of coiled metal, whereby to form lock washers of the type which consists of one or more convolutions, with the ends of the washers displaced from each other.

By my invention, there is provided an improved machine that is adapted to feed and continuously form the metal stock into a spiral, and at predetermined intervals without interrupting the coiling operation, to sever washers from this spiral with the desired number of convolutions in each washer. My machine is particularly characterized by its compactness and simplicity, as well as by the ease with which it may be adjusted to coil and sever lock washers of different diameters and with different numbers of convolutions. The above and other advantageous features of my invention will hereinafter more fully appear, reference being had to the accompanying drawings in which—

Fig. 2 is a view in side elevation of the machine shown in Fig. 1, certain portions being shown in section.

Fig. 3 is a transverse sectional view along the line 3—3 of Fig. 2, looking in the direction of the arrows.

Figure 1:
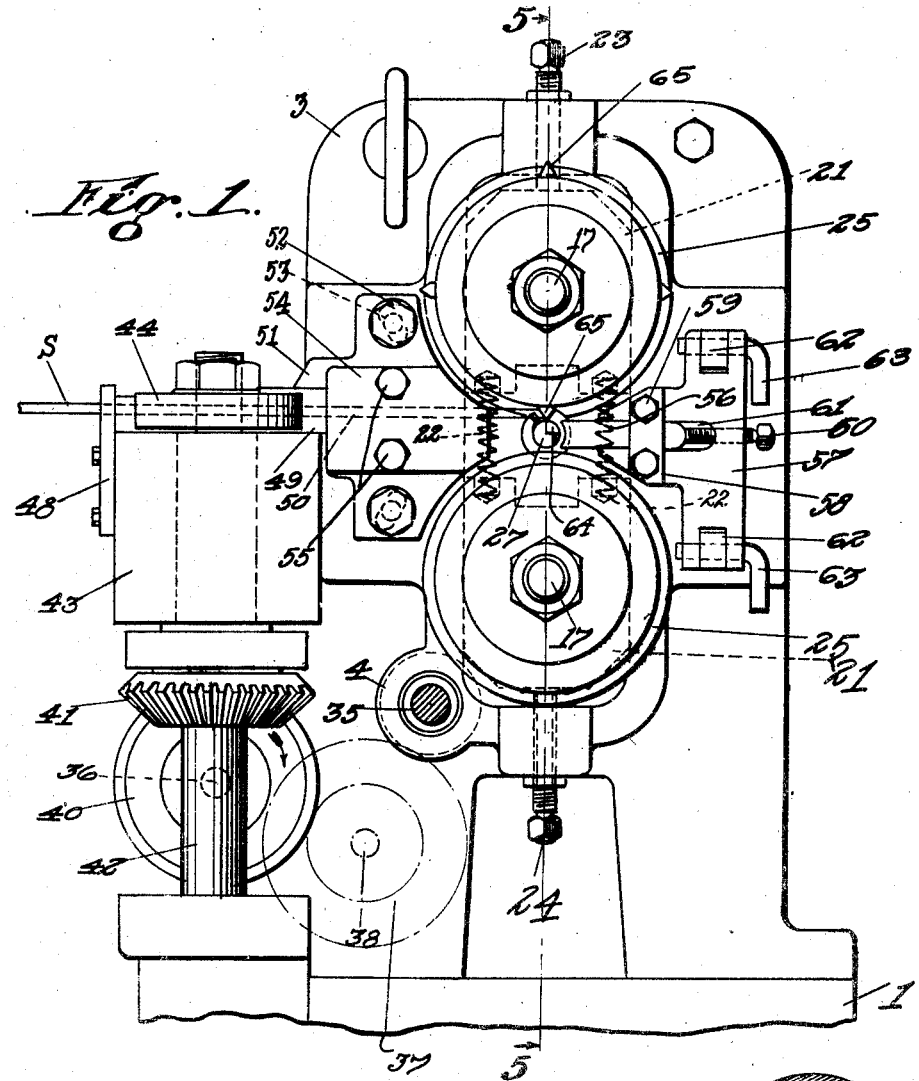
Fig 1 is a view in front elevation of a machine embodying my invention.
Figure 5:
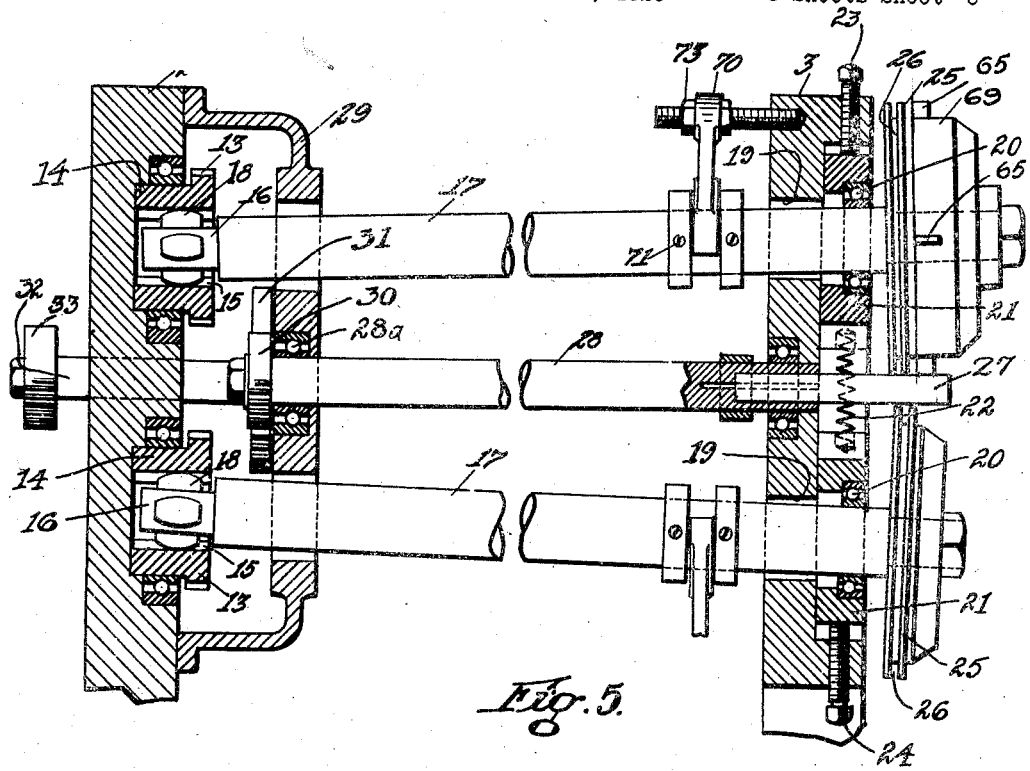

Fig. 5 is a vertical sectional view along the line 5—5 of Fig. 1, looking in the direction of the arrows.

Figure 6:
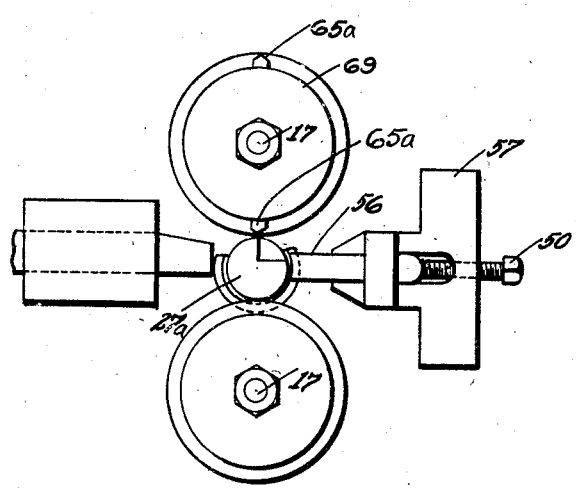

Fig. 6 is a fragmentary view showing the coiling tools and cutters adjusted for forming washers of larger diameter than in Fig. 1.

Figure 7:
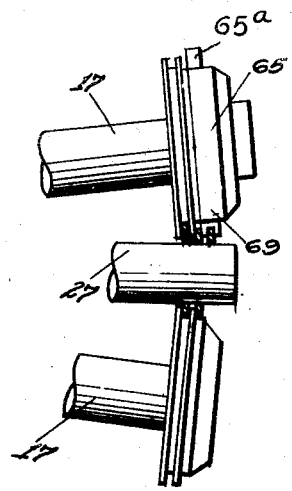

Fig. 7 is a fragmentary view showing the parts of Fig. 6 in elevation.

Fig. 8 is a sectional view showing a combined coiling roll and cutter on an enlarged scale.

Fig. 9 is a sectional view along the line 9—9 of Fig. 8, looking in the direction of the arrows.

Figures 10, 11:
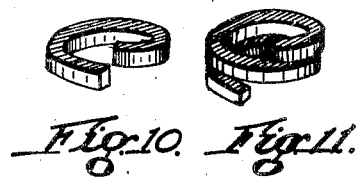

Figs. 10 and 11 are detail views showing different forms of washers made by the machine.

Like reference characters refer to like parts in the different figures.

Referring to Figs. 1 and 2, the machine comprises a suitable base 1 providing upwardly extending standards 2 and 3 between which a drive shaft 4 is rotatably mounted. The shaft 4 is adapted to be driven in any suitable manner, as by means of a pulley 5 carrying a belt 6 connected to a suitable source of power not shown. The usual provision is made for disconnecting the shaft 4 from its source of power, as by means of a belt shifter 7 which is adapted to move the belt 6 from the driving pulley 5 to an idler pulley 8.

The drive shaft 4 carries a pinion 9 in mesh with a gear 10 mounted on a shaft 11 suitably journalled in the standards 2 and 3. As best shown in Fig. 3, the shaft 11 carries a gear 12 adjacent to the standard 2, which gear 12 is in mesh with gear teeth 13 provided on sleeves 14 that are rotatably supported in the standard 2. As best shown in Fig. 5, each gear sleeve 14 is provided with a central opening having slots 15 extending longitudinally thereof, and each gear sleeve 14 is adapted to receive the reduced end portion 16 of a shaft 17. In forming the reduced portion 16 of each shaft 17, a number of splines 18 are provided corresponding in number to the slots 15, and as the splines 18 are rounded, each shaft 17 is capable of limited universal movement with respect to its supporting gear sleeve 14 in addition to longitudinal movement.

Each shaft 17 extends loosely through an opening 19 in the front standard 3 and is rotatably supported by means of an anti-friction swiveled bearing 20 carried by a bearing block 21. The bearing blocks 21 are held apart by springs 22 shown in Figs. 1 and 5, and the distance between the shafts 17 is determined by set screws 23 and 24. The upper set screw 23 limits the upward movement of the bearing block 21 for the upper shaft 17, while the lower set screw 24 serves to support the bearing block 21 of the lower shaft 17.

Referring to Figs. 1 and 5, each shaft 17 carries a coiling roll 25 provided with a groove 26, and these rolls 25 are supported above and below a coiling mandrel 27 with their grooves 26 offset longitudinally of the mandrel so as to confine the stock thereon in the form of a coil. The coiling mandrel 27 is received in a shaft 28 which extends rearwardly through the standard 3 and is rotatably supported near its end in a bearing 28ª carried by a bracket 29 secured to the rear standard 2. The shaft 28 carries a pinion 30 in mesh with a gear 31 carried on a countershaft 32 which extends rearwardly through the standard 2 and is journalled therein, see Fig. 3. The countershaft 32 carries a pinion 33 in mesh with a gear 34 mounted on the shaft 11, whereby the mandrel 27 is adapted to be driven in unison with the coiling roll shafts 17, but at a different speed, determined by the diameter of the washers being coiled, as will be hereinafter more fully described.

Figure 4:
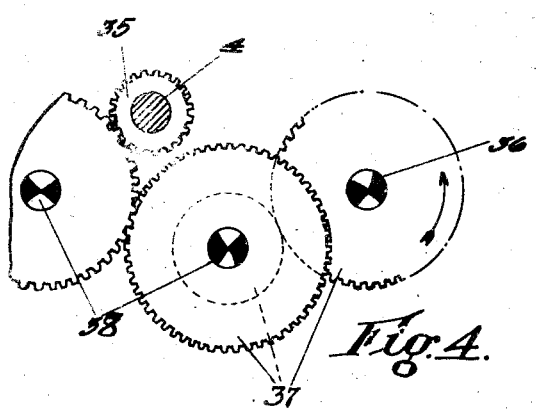
Fig. 4 is a transverse sectional view along the line 4—4 of Fig. 2, looking in the direction of the arrows.

As best shown in Figs. 2 and 4, the drive shaft 4 carries a pinion 35 which is adapted to drive a shaft 36 extending parallel thereto through change gears 37 carried by countershafts 38, the direction of rotation of the shaft 36 being indicated by the small arrow. As shown in Fig. 2, the shaft 36 is journalled in a boss 39 extending upwardly from the base 1 and carries a bevel gear 40 at its other end, which is in mesh with a bevel gear 41 carried by a vertical shaft 42. The shaft 42 is journaled in a forwardly extending bracket 43 and carries at its upper end a feed roll 44. An idler feed roll 45 is adapted to hold the stock 28 in engagement with the periphery of the positively driven feed roll 44 by means of a set screw 46 engaging the bearing of the shaft 47 on which the roll 45 is mounted. The stock S is directed between the rolls 44 and 45 by means of a plate 48 secured to the bracket 43 and provided with an opening of substantially the same cross section as the stock, which may be round or rectangular as desired.

Rotation of the roll 44 in cooperation with the roll 45 is adapted to feed the stock S into a guide 49 which is interposed between the mandrel 27 and the feed rolls and provides a longitudinal groove 50. The guide 49 is carried on the standard 3 by a block 51 adjustable on the standard by means of bolts 52 threaded into the standard 3 and passing through curved slots 53 provided in the block 51. The guide 49 is secured to the block 51 by a clamp plate 54 and bolts 55 received in the block 51. Obviously, the guide 49 may be adjusted longitudinally on the block 51 with respect to the mandrel 27, while the position of the block 51 can be changed at will to deliver the stock S tangentially to mandrels 27 of different diameters.

A coiling point 56 is disposed opposite to the guide 49 and is clamped to a holder 57 by means of a plate 58 and bolts 59 coacting therewith. The coiling point 56 is held against the pressure of the stock being coiled by means of a stud 60 threaded into the holder 57 and extending into a slot 61 in which the coiling point 56 is adjustable. The holder 57 is supported on the standard 3 by means of lugs 62 and pins 63 which pass through the lugs 62 and bifurcated portions of the holder 57 on either side thereof. It is obvious that the coiling point 56 may be readily adjusted with respect to the axis of the mandrel 27 for different diameters of washers being coiled, the stud 60 always maintaining the coiling point 56 in its adjusted position against the pressure of the stock being coiled.

As clearly shown in Fig. 1, the mandrel 27 is provided with a notch 64, and any one of a number of cutters 65 carried by the upper shaft 17, is adapted to coact with the edge of this notch 64 to sever a washer from the coiled stock on the mandrel 27, without interrupting the coiling operation. It is also evident from Fig. 1, that when the cutters 65 are four in number, as shown, the mandrel 27 must make four complete revolutions, while the shaft 17 carrying the cutters is making only one. Adjustment of the speed of the mandrel 27 is rendered possible by the gears 33 and 34 between the shafts 32 and 11, respectively, and it is evident that the speed relation between the mandrel 27 and the shaft 17 may be altered by changing the ratio between the gears 33 and 34. Thus when washers of larger diameter are being formed on a larger mandrel 27ª, the shaft 17 carries only two cutters 65ª, see Figs. 6 and 7, and the shaft 28 is driven at a speed substantially one half of the speed used for the mandrel 27 cooperating with four cutters 65. Furthermore, the gearing 37 may be readily changed to vary the speed of rotation of the feed roll 44, in accordance with the rate at which the stock S is to be coiled on the mandrel 27.

Referring now to Figs. 8 and 9, an arrangement is shown whereby the cutters 65 may be readily adjusted to compensate for wear due to continued operation. The shaft 17 provides a reduced portion 17ª on which is keyed the coiling disk 25 and also a cutter head 66. The cutter head 66 provides a number of radial slots 67 and an annular groove 68 within which is seated an adjusting plate 69. The cutters 65 are clamped in the slots 67 and the adjusting plate 69 is clamped in the groove 68 by means of a nut 70 on the shaft 17 which tends to jam the disk 25 and the cutter head 62 against the shoulder 71 at the end of the reduced portion 17ᵃ of the shaft 17.

The adjusting plate 69 is provided with a number of notches 72 in which the cutters 65 bottom, and it is evident that should the plate 69 be turned angularly with respect to the head 66, the inclined surfaces of the notches 72 will tend to wedge the cutters 65 outwardly through the slots 67. Normally, the adjusting plate 69 is prevented from turning on the head 66 by means of a pin 73 received in a hole provided in the head 66, and also in one of a series of notches 74 provided on the inner periphery of the plate 69. When, however, it is desired to cause the cutters 65 to project further from the head 66 in order to compensate for wear, the plate 69 is removed and turned enough to bring the next adjacent notch 74 into register with the pin 73 in the head 66. In this way, all of the cutters 65 are forced outwardly exactly the same amount, so that they will cut uniformly when the machine is again operated.

From the foregoing it is apparent that by my invention I have provided a machine for the production of lock washers that is susceptible of a wide range of adjustments to accomodate it for coiling and cutting washers of different diameters and pitch. The universal mounting of the shafts 17 which carry the coiling disks 25 and cutters 65 is particularly advantageous, for this mounting enables the coiling disks 25 and the cutters 65 to be vertically adjusted with respect to different sizes of mandrels by means of the studs 23 and 24. Furthermore, the shafts 17 may be adjusted longitudinally to vary the pitch of the washers being coiled by the disks 25 by means of yokes 75 embracing each shaft between collars 76. Each yoke 75 is mounted on a threaded stud 77 carrying nuts 78 for determining the position of the yoke 75 on the stud 77. By turning the nuts 78 in the same direction, a yoke 75 may be moved to the left or to the right, and thereby shift the associated shaft 17 to properly position the coiling disk 25 carried thereby. When a shaft 17 is so moved longitudinally, the splines 18 slide readily in the keyways or slots 15 inside the gear sleeves 14. The different inclinations of the shafts 17 when coiling washers of different diameters and pitch is shown on a somewhat exaggerated scale in Figs. 5 and 7, it being evident that this inclination is small in a full sized machine.

In operation, the machine may be caused to cut washers of one or more convolutions as desired by varying the number of cutters 65 used with a given mandrel 27; it being evident that removal of every other cutter 65 in Fig. 1 will result in the cutting of washers each having two convolutions, see Fig. 11. Normally, the speed of the feed roll 44 is such as to feed the stock S so that the severed ends of each washer are substantially in line; that is to say, the cutting occurs at the same place on each convolution, as in Fig. 10. It is possible, however, to cut down the speed of the roll 44 so that the delivery speed of the stock S is less than the peripheral speed of the mandrel 27; in this event the cutters 65 cooperate with the notch 64 before a complete convolution is coiled and each washer will have its ends spaced, as in Fig. 11. Or the roll 44 can be speeded up to cause the ends of the washers to overlap each other.

In view of the foregoing description of the operation and adjustment of my machine, it is apparent that my machine is adapted for the rapid and economical production of washers of different sizes, pitches and length. Furthermore, the machine of the present invention differs radically from washer forming machines as previously constructed owing to the fact that my machine is particularly characterized by the continuous coiling of a strip into a spiral and the severance of separate washers from this spiral at predetermined intervals, without interrupting the coiling operation. Because of the above characteristics, my machine possesses many advantages over prior washer-making machines employing reciprocating cutters operating in definite timed relation with means for intermittently feeding and coiling the stock, since the production of such machines is interrupted each time a washer is severed. For the same reason, the machine of the present invention possesses advantages over machines adapted to continuously coil the stock and then separately sever the washers from the coiled stock by a reciprocating cutter. In other words, the essential feature of my machine, as distinguished from the prior art, resides in the cooperation between the continuously rotating cutters and the continuously rotating mandrel to sever convolutions of the coiled stock, as completed washers, as fast as the stock is coiled by the continuously rotatably driven feed rolls and stock coiling rolls.

I claim:

1. In a machine of the class described, the combination with a rotatable mandrel, coiling disks located above and below the axis of said mandrel and a positively driven roll for feeding stock between said mandrel and said coiling disks to form the stock in a coil, of an annular plate rotatable with and carried by one of said coiling disks carrying circumferentially spaced cutters for cooperation with a cutting edge provided on said mandrel, the peripheral speed of the cutters bearing a fixed relation to the speed of the said mandrel, irrespective of the rate at which stock is delivered by said feed roll.

2. In a machine of the class described, the combination with a mandrel, rotatably mounted shafts carrying coiling disks whose planes of rotation are at an angle to each other above and below the axis of said mandrel, and means for feeding stock to said mandrel and disks for formation into a coil, of means for adjusting said coiling disk shafts vertically and longitudinally with respect to said mandrel to vary both the diameter and pitch of the spiral in which the stock is coiled.

3. In a machine of the class described, the combination with a mandrel, rotatably mounted shafts carrying coiling disks whose planes of rotation are at an angle to each other above and below the axis of said mandrel, and means for feeding stock to said mandrel and disks for formation into a coil, of means for securing longitudinal adjustment of said coiling disk shafts to vary the pitch of the spiral in which the stock is coiled.

4. In a machine of the class described, the combination with a mandrel, rotatably mounted shafts carrying coiling disks whose planes of rotation are at an angle to each other above and below the axis of said mandrel, and means for feeding stock to said mandrel and disks for formation into a coil, of means for rotatably supporting one end of each of said coiling disk shafts for universal as well as longitudinal adjustment.

5. In a machine of the class described, the combination with a mandrel, rotatably mounted shafts carrying coiling disks whose planes of rotation are at an angle to each other above and below the axis of said mandrel, and means for feeding stock to said mandrel and disks for formation into a coil, of means for rotatably supporting one end of each of said coiling disk shafts for universal movement, of means for rotatably supporting the other end of said shaft for vertical adjustment, and means for moving said shaft longitudinally.

6. In a machine of the class described, the combination with a drive shaft, a rotatable mandrel, rotatable shafts connected to said drive shaft and carrying coiling disks disposed above and below said mandrel, and feed rolls for delivering stock to said mandrel and disks, of change gearing connecting said drive shaft to said mandrel and to said feed rolls respectively.

7. In a machine of the class described, the combination with a drive shaft, a rotatable mandrel, rotatable shafts connected to said drive shaft and carrying coiling disks disposed above and below said mandrel, and feed rolls for delivering stock to said mandrel and disks, of change gearing connecting said drive shaft to a shaft extending at right angles to the axis of said mandrel and carrying one of said feed rolls.

8. In a machine of the class described, the combination with a drive shaft, a rotatable mandrel, rotatable shafts connected to said drive shaft and carrying coiling disks disposed above and below said mandrel, and feed rolls for delivering stock to said mandrel and disks, of means for driving said mandrel, coiling disks and feed rolls in unison from said drive shaft, means for guiding the stock in its passage from said feed rolls to said mandrel, and a stationary coiling tool disposed between said disks opposite to said guide.

9. In a machine of the class described, the combination with a drive shaft, a rotatable mandrel, rotatable shafts connected to said drive shaft and carrying coiling disks disposed above and below said mandrel, and feed rolls for delivering stock to said mandrel and disks, of means for driving said mandrel, coiling disks and feed rolls in unison from said drive shaft, means for guiding the stock in its passage from said feed rolls to said mandrel, and a stationary coiling tool disposed between said disks opposite to said guide, said disks, guiding means and tool all being adjustable with respect to said mandrel for coiling spirals of different diameter.

10. In a machine of the class described, the combination with a mandrel, rotatably driven shafts extending above and below said mandrel, said shafts being rotatable at an angle to each other, coiling disks carried by said shafts cooperating with said mandrel for coiling stock into a spiral on said mandrel, means for adjusting said shafts to adapt said disks for the formation of spirals of different pitch and diameter, and a cutter rotatable with and carried by one of said coiling disks adapted to cooperate with said mandrel to sever the coiled stock at predetermined intervals.

11. In a machine of the class described, the combination with a mandrel, rotatably driven shafts extending above and below said mandrel, said shafts being rotatable at an angle to each other, coiling disks carried by said shafts cooperating with said mandrel for coiling stock into a spiral on said mandrel, means for adjusting said shafts to adapt said disks for the formation of spirals of different pitch and diameter, and an annular plate mounted on one of said shafts adjacent to a coiling disk carrying circumferentially spaced cutters for cooperation with a cutting edge provided on said mandrel.

12. In a machine of the class described, the combination with rotatably driven feed rolls, a rotatably driven mandrel providing a cutting edge, and rotatably driven coiling rolls arranged about the axis of said mandrel, the cooperation between said feed rolls, mandrel and coiling rolls being adapted to continuously coil stock into a spiral, of a cutter carried by and rotatable with one of said coiling rolls adapted by its rotation to cooperate with the cutting edge of said mandrel at predetermined intervals during the continuous coiling of the spiral to sever separate convolutions of said spiral.

FRANK H. SLEEPER.